US008936216B2

(12) United States Patent
Remene et al.

(10) Patent No.: US 8,936,216 B2
(45) Date of Patent: Jan. 20, 2015

(54) COMPOSITE STRUCTURING PANEL FOR THE TRAILING EDGE OF AN AIRCRAFT ELEMENT

(75) Inventors: Didier Remene, Buc (FR); Denis Millepied, Magny-les-Hameaux (FR); Paulo Francisco, Bezons (FR); Valérian Montagne, Paris (FR); Jean-Luc Pacary, Meudon La Foret (FR); Arnaud Bertrand, Ecquevilly (FR)

(73) Assignee: Societe Lorraine de Construction Aeronautique, Florange (FR)

( * ) Notice: Subject to any disclaimer, the term of this patent is extended or adjusted under 35 U.S.C. 154(b) by 17 days.

(21) Appl. No.: 13/320,968

(22) PCT Filed: May 28, 2010

(86) PCT No.: PCT/FR2010/051040
§ 371 (c)(1),
(2), (4) Date: Nov. 17, 2011

(87) PCT Pub. No.: WO2010/136741
PCT Pub. Date: Dec. 2, 2010

(65) Prior Publication Data
US 2012/0061515 A1    Mar. 15, 2012

(30) Foreign Application Priority Data

May 28, 2009 (FR) .................................... 09 02579
Dec. 18, 2009 (FR) .................................... 09 06157

(51) Int. Cl.
*B64C 3/20* (2006.01)
*B64C 3/26* (2006.01)
(Continued)

(52) U.S. Cl.
CPC . *B64C 3/20* (2013.01); *B29C 70/30* (2013.01); *B29D 24/004* (2013.01);
(Continued)

(58) Field of Classification Search
USPC ........... 244/123.1, 123.2–123.4, 211–217, 87
See application file for complete search history.

(56) References Cited

U.S. PATENT DOCUMENTS 3,219,123 A * 11/1965 Stocker .......................... 416/230
4,298,417 A * 11/1981 Euler et al. ..................... 156/228
(Continued)

FOREIGN PATENT DOCUMENTS

DE    1275279 B    8/1968
EP    1764307 A1 *  3/2007

OTHER PUBLICATIONS

"Carbon (fiber)", Wikipedia, accessed Feb. 10, 2014, <en.wikipedia.org/wiki/Carbon_(fiber)>.*
(Continued)

*Primary Examiner* — Tien Dinh
*Assistant Examiner* — Michael Wang
(74) *Attorney, Agent, or Firm* — Brinks Gilson & Lione

(57) ABSTRACT

The invention relates to a composite structuring panel (1) for the trailing edge of an aircraft element, having: an upper surface (3); a lower surface (5); an edge (7) connecting said upper (3) and lower (5) surfaces; the upper surface (3) and the lower surface (5) being connected by transverse stiffeners (9) and the structuring panel being made of a unitary part forming the upper surface (3), the lower surface (5), the edge (7), and the transverse stiffeners (9). The invention also relates to a method for manufacturing such a panel (1), and to an aircraft element comprising such a panel (1).

17 Claims, 2 Drawing Sheets

(51) Int. Cl.
  *B29C 70/30* (2006.01)
  *B29D 24/00* (2006.01)
  *B29D 99/00* (2010.01)
  *B64C 3/18* (2006.01)
  *B29L 31/30* (2006.01)

(52) U.S. Cl.
  CPC ........... *B29D 99/0014* (2013.01); *B64C 3/187* (2013.01); *B64C 3/26* (2013.01); *B29L 2031/3085* (2013.01); *Y02T 50/433* (2013.01); *Y02T 50/43* (2013.01)
  USPC .................. 244/123.1; 244/123.3; 244/87

(56) References Cited

U.S. PATENT DOCUMENTS

| | | | |
|---|---|---|---|
| 4,657,615 A * | 4/1987 | Braun et al. | 156/245 |
| 5,755,558 A * | 5/1998 | Reinfelder et al. | 416/230 |
| 6,234,423 B1 * | 5/2001 | Hirahara et al. | 244/123.7 |
| 7,380,753 B2 * | 6/2008 | Kairouz | 244/123.1 |
| 7,681,835 B2 * | 3/2010 | Simpson et al. | 244/123.3 |
| 2001/0017336 A1 * | 8/2001 | Hirahara et al. | 244/123 |
| 2002/0195524 A1 * | 12/2002 | Amaoka et al. | 244/123 |
| 2006/0150413 A1 * | 7/2006 | De Been et al. | 29/897.2 |
| 2006/0249626 A1 | 11/2006 | Simpson et al. | |

OTHER PUBLICATIONS

International Search Report issued Dec. 21, 2010 by the European Patent Office re: International Application No. PCT/FR2010/051040 citing: EP 1 764 307 A, US 3,219,123 A, US 2001/017336 A1, US 4,657,615 A, DE 12 75 279 B and US 2006/249626 A1.

Written Opinion for corresponding application PCT/FR2010/051040 filed May 28, 2010; Mail date Dec. 21, 2010.

* cited by examiner

COMPOSITE STRUCTURING PANEL FOR THE TRAILING EDGE OF AN AIRCRAFT ELEMENT

TECHNICAL FIELD

The present invention relates to a composite structuring panel for a trailing edge of an element of an aircraft.

The invention also relates to an aircraft element including such a panel.

BACKGROUND

Composite panels are panels frequently used in aerospace since with them the aircraft may be considerably lightened.

Certain aircraft portions require structuring panels ensuring good mechanical strength. Mention may most particularly be made of the trailing edges, such as those of airplane control surfaces.

Composite structuring panels of the sandwich type are currently used, comprising a structure with a cellular core put between an internal skin and an outer skin.

Typically, the internal skin and the external skin each consist of one or more fiber folds pre-impregnated with resin which is then polymerized during a baking step.

Other methods used dry fiber folds, i.e. not pre-impregnated with resin, the resin being applied later on during a baking step during which it is forced by suction to diffuse between the fiber folds.

A composite sandwich panel may also comprise several central layers, of the same type or of different types, the central layers may themselves be separated by a composite material layer.

The central layers may for example be of the cellular, foam type or further comprise one or more meltable inserts.

Composite sandwich panels using a honeycomb or foam core, for example, contribute to reducing the mass of the objects while retaining or enhancing their mechanical properties.

However, this type of panel is generally not suitable for making trailing edges.

Indeed, the trailing edges have a very small radius of curvature which is difficult to obtain with a composite sandwich panel.

Moreover, it is important to have aerodynamic continuity as perfect as possible in order not to have an impact on the performances of the aircraft.

Further, there exists a need for simplified manufacturing of a structuring composite panel having a trailing edge.

BRIEF SUMMARY

The invention provides such a panel having good aerodynamic continuity.

It may also be desirable to limit at most buckling of the skins of the panel by guaranteeing good flexural and torsional rigidity.

to the invention provides a panel allowing limitation of the buckling of the skins and enhancing the structural mechanical strength, while being simple to make.

For this purpose, according to a first aspect, the invention provides a composite structuring panel of a trailing edge for an element of an aircraft having:
an upper surface;
a lower surface;
an edge connecting said upper and lower surfaces;
characterized in that the upper surface and the lower surface are connected through transverse stiffeners and in that the structuring panel comprises a single one-piece part forming the upper surface, the lower surface, the edge as well as the transverse stiffeners.

With the panel of the present invention, it is possible to have excellent aerodynamic continuity at the trailing edge. Indeed, the panel of the invention is formed with a single one-piece part. No junction between panels is required, such a junction would have an impact on the aerodynamic performance.

Further, the presence of transverse stiffeners ensures excellent structural strength in spite of the very small radius of curvature at the edge of the panel.

Finally, as the panel is entirely made in a single one-piece part, the manufacturing of the latter is highly simplified. Indeed, it is no longer necessary to assemble and to attach the different elements forming the structuring panel.

Preferentially, the skin forming said panel includes a plurality of folds, one or more interior folds of which form the transverse stiffeners with which it is possible to obtain a composite structuring panel which is highly resistant for absorbing a substantially transverse impact at the upper or lower surface.

Advantageously, at least one longitudinal spar is positioned so that the guiding axis of each longitudinal spar and the guiding axis of the transverse stiffeners are not colinear and the structuring panel comprises a one-piece part forming the upper surface, the lower surface, the trailing edge, the transverse stiffeners and the longitudinal spar(s).

By "guiding axis" is meant the axis guiding a spar or a transverse stiffener along the largest dimension of the latter.

By the presence of one or more longitudinal spars positioned substantially perpendicularly to the transverse stiffeners, buckling of the upper and lower skins may be limited and the structural mechanical strength of the panel of the invention may be enhanced in two directions substantially perpendicular to the panel of the invention. Further, the panel of the invention being entirely made as one piece, exhibits a construction which is simple to achieve.

Preferentially, the guiding axis of each longitudinal spar and the guiding axis of the transverse stiffeners are substantially perpendicular.

Preferentially, at least one longitudinal spar is positioned between two transverse stiffeners which allows local reinforcement of the structural strength of the panel of the invention.

Preferentially, the skin forming said panel includes a plurality of folds, one or more interior folds of which form the longitudinal spar(s).

Advantageously, the panel of the invention includes reinforcement folds between the interior folds, which allows reinforcement of the longitudinal spar(s) and/or the transverse stiffeners.

In a second aspect, the invention provides a method for manufacturing a panel according to the invention characterized in that it includes:
a first step (A) in which cores are deposited each surrounded at least partly with a draping skin, on a base skin over a suitable length of the latter in order to allow the base skin to be folded over itself;
a second step (B) during which the base skin is folded over the draped cores;
a third step (C) in which the thereby obtained panel is polymerized so as to integrate the folds of the draping into the base skin in order to form the transverse stiffeners; and
a fourth step (D) in which the cores are removed in order to obtain the structuring panel.

Preferentially, the cores have a decreasing height along the length of said cores with which an excellent aerodynamic profile of the structuring panel may be obtained.

Advantageously, each core is draped by a draping skin of the monolithic type having a plurality of folds with which it is possible to obtain good melting among the different elements making up the panel of the invention.

Advantageously, the method for manufacturing a panel of the invention includes:
- a first step (A) in which first cores and at least one second core are deposited, each surrounded at least partly by a draping skin over a base skin, along two non-colinear directions, so that said base skin may be folded over itself;
- a second step (B) in which the base skin is folded over the first and second draped cores;
- a third step (C) in which the thereby obtained panel is polymerized so as to integrate the folds of the draping into the base skin in order to form the transverse stiffeners and the longitudinal spar(s); and
- a fourth step (D) in which the first cores and the second core(s) are removed in order to obtain the structuring panel.

Preferentially, the second core(s) has(have) a decreasing height along the cross-section of said cores with which the panel of the invention may have a good aerodynamic line.

Preferentially, each first and second cores are draped with a draping skin of the monolithic type exhibiting a plurality of folds.

Preferentially, in step A, first cores are positioned before the trailing edge so as to form a space between the trailing edge and the first cores, a space in which one or more second cores substantially parallel to the trailing edge are installed.

According to another aspect, the invention provides an aircraft element including at least one structuring panel according to the invention or obtained according to a method of the invention.

Preferentially, the element of the invention is an airplane control surface.

BRIEF DESCRIPTION OF THE DRAWINGS

The invention will be further understood upon reading the non-limiting description which follows, made with reference to the figures appended herein.

DETAILED DESCRIPTION

Figure 1:
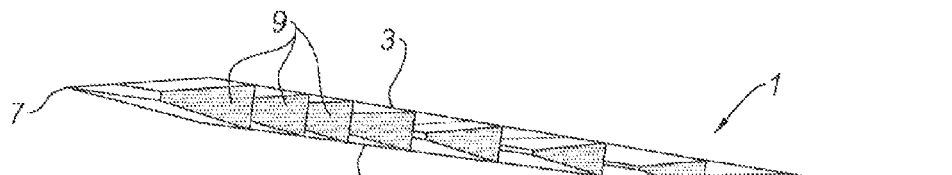
FIG. 1 is a perspective view of a panel according to a first embodiment of the present invention.

The panel 1 of the invention includes an upper surface 3, a lower surface 5 and an edge 7 connecting the upper 3 and lower 5 surfaces. The panel 1 of the invention defines a trailing edge 7 directly obtained during the baking of the panel 1 of the invention which simplifies the manufacturing of the latter.

The upper surface 3 and the lower surface 5 are connected through transverse stiffeners 9 integrated to the latter.

In other words, in a first embodiment of the present invention illustrated in FIG. 1, the panel of the invention 1 comprises a single one-piece part forming the upper surface 3, the lower surface 5, the edge 7 as well as the transverse stiffeners 9.

Figure 6:
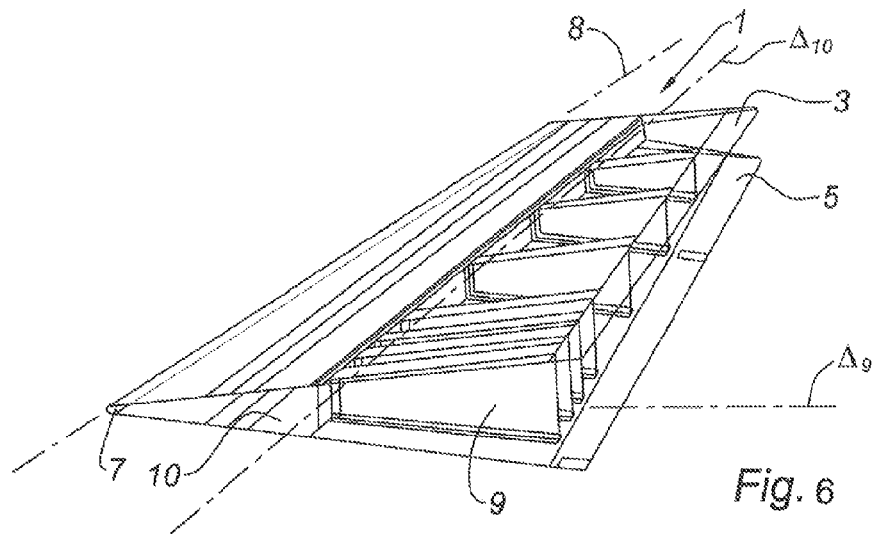
FIG. 6 is a perspective view of a panel according to a second embodiment of the present invention.
Figure 7:
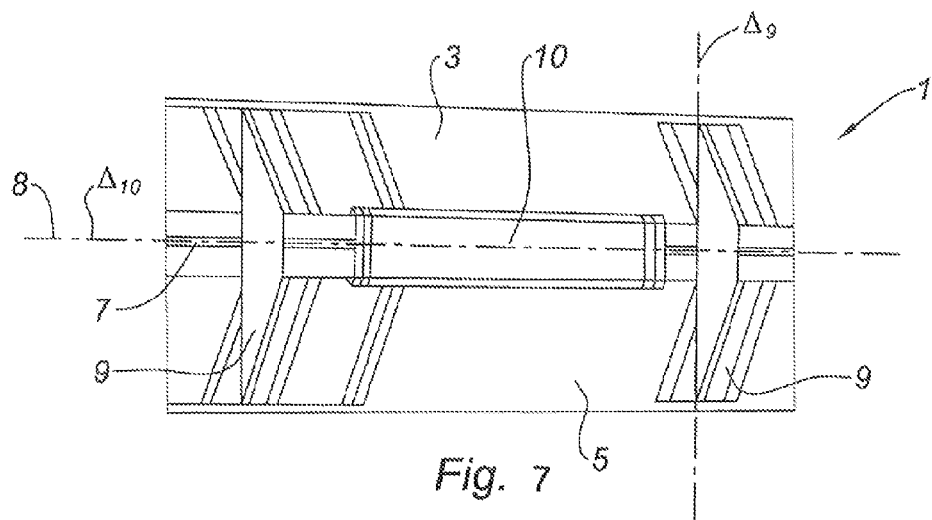
FIG. 7 is a perspective bottom view of an alternative embodiment of the panel of FIG. 6.

In a second embodiment of the present invention illustrated in FIGS. 6 and 7, the upper surface 3 and the lower surface 5 are connected through transverse stiffeners 9 as well as through at least one or several longitudinal spars 10, said stiffeners 9 and said spar(s) 10 being integrated to the latter.

In this second embodiment, at least one longitudinal spar 10 is positioned so that the guiding axis $\Delta_{10}$ of each longitudinal spar 10 and the guiding axis $\Delta_9$ of the transverse stiffeners 9 are not colinear. Thus advantageously, the panel of the invention 1 has very good structural strength along two non-parallel directions.

Preferentially, the guiding axis $\Delta_{10}$ of each longitudinal spar 10 and the guiding axis $\Delta_9$ of the transverse stiffeners 9 are substantially perpendicular.

By <<longitudinal>> is meant a direction substantially colinear to the guiding axis 8 of the trailing edge 7. As illustrated in FIGS. 6 and 7, the guiding axis 8 of the trailing edge may be substantially colinear with the guiding axis $\Delta_{10}$ of each longitudinal spar 10 and/or substantially perpendicular to the guiding axis $\Delta_9$ of the transverse stiffeners 9.

According to an alternative not shown, the guiding axis $\Delta_9$ of the transverse stiffeners 9 may be non-colinear with the guiding axis 8 of the trailing edge without being perpendicular to the latter. Also, the guiding axis $\Delta_{10}$ of each longitudinal spar 10 may be non-colinear with the guiding axis 8 of the trailing edge and also non-colinear with the guiding axis $\Delta_9$ of the transverse stiffeners 9.

By <<transverse>> is meant a direction substantially perpendicular to the planes formed by the upper surface 3 and the lower surface 5.

The longitudinal spar(s) 10 is(are) typically placed at the end of the transverse stiffeners 9 facing the trailing edge 7. To do this, the transverse stiffeners 9 are placed at a non-zero distance from the trailing edge 7.

The panel 1 of the invention may thus include a single longitudinal spar or on the contrary a plurality of longitudinal spars. The use of a plurality of spars 10, notably placed between two transverse stiffeners 9 (see FIG. 7) allows local limitation of any buckling of the panel 1 of the invention. Said spar 10 then has a length at most equal to the distance between both transverse stiffeners 9 along the guiding axis 8.

Typically, the length of a longitudinal spar 10 along the guiding axis $\Delta_{10}$ of the latter may assume any value less than or equal to the length of the panel 1 of the invention. In the case when the longitudinal spar 10 does not have its guiding axis $\Delta_{10}$ substantially parallel to the guiding axis 8 of the trailing edge, the length of said spar 10 may be greater than the length of the panel 1 of the invention without said spar 10 jutting out from said panel 1.

Also, the length of a transverse stiffener 9 along the guiding axis $\Delta_9$ of the later may assume any value less than or equal to the width of the panel 1 of the invention. In the case when the transverse stiffener 9 does not have its guiding axis $\Delta_9$ substantially perpendicular to the guiding axis 8 of the trailing edge, the length of said stiffener 9 may be greater than the width of the panel 1 of the invention without said stiffener 9 jutting out from said panel 1.

Moreover, in this second embodiment, the panel of the invention 1 comprises a single one-piece part forming the upper surface 3, the lower surface 5, the edge 7 as well as the transverse stiffeners 9 and the spar(s) 10.

In both embodiments of FIGS. 1, 6 and 7, the panel 1 of the invention comprises a single monolithic skin.

The monolithic skin may be made in any type of suitable fabrics or fibers known to one skilled in the art which may be impregnated with epoxy resin or another resin. For this purpose, mention may be made of carbon, glass or Kevlar® fibers.

Advantageously, the single monolithic skin is formed with a plurality of folds 18 merged together via a polymerizable resin, such as epoxy resin, positioned between the folds 18.

More specifically, the upper portion 15 of the skin forming the upper surface 3 and the lower portion 17 of the skin forming the lower surface 5 may comprise a plurality of folds 18, the interior folds 19, 21 positioned towards the interior of the panel 1 may extend continuously along said panel 1 from one cross-section as far as a second cross-section.

Figure 2:
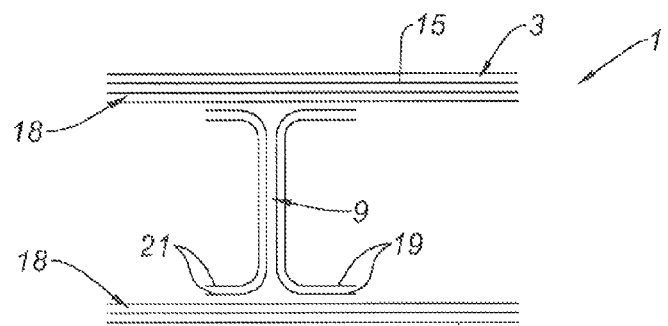
FIG. 2 is an enlarged front view of the embodiment of FIG. 1, and FIGS. 3 to 5 are perspective views of the method for manufacturing a panel of FIG. 1.

In the first embodiment of FIGS. 1 and 2, the fact that the transverse stiffeners 9 consist of folds 18 gives the possibility of obtaining a highly resistant structuring panel 1 for absorbing an impact substantially transverse to the upper 3 or lower 5 surface.

In the second embodiment of FIGS. 6 and 7, the fact that the transverse stiffeners 9 and the spar(s) 10 consist of folds 18 gives the possibility of also obtaining a highly resistant composite structuring panel 1 for absorbing an impact substantially transverse to the upper 3 or lower 5 surface.

Indeed, the panel 1 of the invention is advantageously mechanically reinforced along two non-colinear directions, notably substantially perpendicular, relatively to the plane formed by the panel 1 of the invention.

As illustrated in FIG. 2, the interior folds 19 may extend continuously from the lower portion 17, cross the panel 1 substantially perpendicularly to the lower surface 5 by forming a portion of the folds of a transverse stiffener 9 or of a spar 10 if necessary and before extending at the upper surface 3 again along the cross-section.

The same applies for the other interior folds 21 of the other cross-section.

Thus, depending on the embodiment of the panel, either the transverse stiffener 9 or the transverse stiffener 9 and the spar(s) 10 are formed by the interior folds 19 and 21 from the cross-sections.

Of course, the folds 18 used in each of the embodiments of panels may be of identical or different nature depending on the sought properties.

As a nature of conventionally used folds, mention may be made i.a. of glass fibers, carbon fibers and Kevlar fibers.

In the case when the folds 19, 21 involved in the reinforcements would not have by themselves sufficient strength or would have to be reinforced, it is notably possible to sew the totality or part of these folds 19, 21 together. It is also possible to insert between the folds 19, 21, reinforcement folds, such as carbon fibers folds for example which may be present depending on the embodiment of the panel, either in the transverse stiffeners 9 or in the transverse stiffeners 9 and/or in the spar(s) 10.

Figure 3:
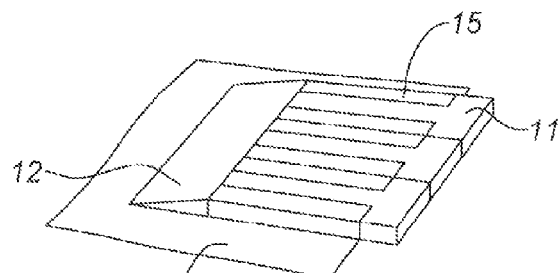
Figures 4, 5:
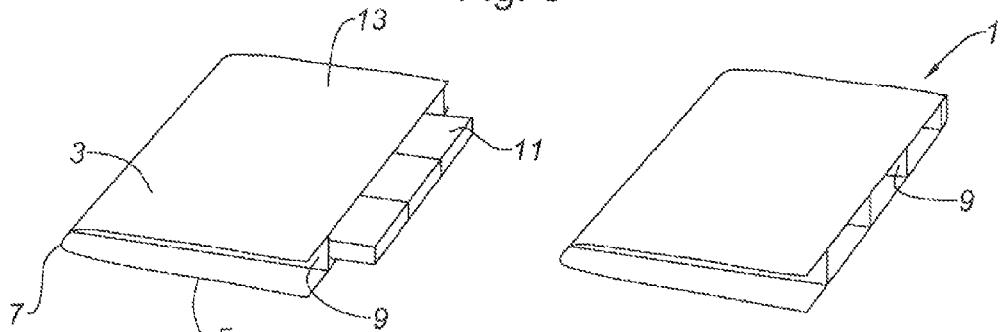

Further, according to the invention, the panel 1 of the invention is obtained by a manufacturing method including:
- a first step A in which cores 11 are deposited, each surrounded at least partially by a draping skin 15, on a base skin 13 over a suitable length of the latter so as to allow the base skin 13 to be folded over itself (FIG. 3);
- a second step B in which the base skin 13 is folded over the draped cores 11 (FIG. 4);
- a third step C in which the thereby obtained panel is polymerized so as to integrate the folds of the draping into the base skin 13 so as to form the transverse stiffeners 9; and
- a fourth step D in which the cores 11 are removed in order to obtain the structuring panel (see FIG. 5).

Subsequently, the expressions <<surrounded at least partly>> and <<draped>> are synonyms. Thus, the term of <<draping>> designates the fact of surrounding a core at least partly.

Moreover, in an alternative embodiment, the panel 1 of the invention is obtained by the manufacturing method including:
- a first step (A) in which first cores 11 and at least one second core 12 are deposited, each surrounded at least partly by a draping skin 15, over a base skin 13 along two non-colinear directions $\Delta_{10}$ and $\Delta_9$, notably over a length and over a width of said base skin 13, respectively, so that the latter may be folded over itself (see FIG. 4);
- a second step B in which the base skin 13 is folded over the first 11 and second 12 draped cores (FIG. 5);
- a third step C in which the thereby obtained panel is polymerized so as to integrate the folds of the draping into the base skin 13 so as to form the transverse stiffeners 9 and the spar(s) 10; and
- a fourth step D in which the first cores 11 and the second core(s) 12 are removed in order to obtain the structuring panel (see FIG. 6).

By means of the method of the invention, it is possible to adjust the number of folds between two transverse stiffeners 9 and also at the spar(s) 10, if necessary. It is then possible to optimize the mass of the panel 1 of the invention while guaranteeing significant longitudinal and transverse stiffness.

Further, by means of the method of the invention, the panel 1 is formed with a single part by melting the base skin 13 folded over itself and the skin of the draping.

Further, the method gives the possibility of introducing the desired number of stiffeners and of spar(s) if necessary, according to the sought structural strength by increasing or decreasing the number of cores or the dimensions of the latter.

Further, according to the embodiment of the panel, the method does not impose any constraint for the positioning of the stiffeners and that of the spar(s) if necessary. They are placed so as to improve their structural utility.

More particularly, in step A, the first cores 11 are each surrounded at least partially by a draping skin 15 on the side edges of said cores 11.

The second core(s) 12 are each surrounded at least partially by a draping skin 15 on at least one portion of a longitudinal side of said cores 12.

The cores 11 used in the first embodiment of the panel or the first cores 11 and the second core(s) 12 used in the second embodiment of the panel have a suitable shape so as to form the transverse stiffeners 9 as well as the spar(s) 10, if necessary. To do this, they typically have a cross-section of a substantially triangular, rectangular, square, or even trapezoidal shape.

Typically, first cores 11 allowing formation of the transverse stiffeners 9 are positioned before the edge 7 so as to form a space in which second core(s) 12 are installed parallel to the edge 7 allowing formation of the spar(s) 10 (see FIG. 4) in order to stop the stiffeners according to the sought mechanical characteristics (see FIG. 3). In this way, the structuring panel 1 may have an excellent aerodynamic profile.

Advantageously, the cores 11 have a height which decreases along the length of said cores 11 so as to follow the small radius of curvature of the edge 7.

Further, in the second embodiment of the panel, the second core(s) 12 has(have) a cross-section with a decreasing height on the cross-section of said core(s) 12 so as to follow the small radius of curvature of the edge 7. In this way, the structuring panel 1 may have an excellent aerodynamic profile.

Advantageously, in the first embodiment of the panel, the cores 11 are placed on the base skin 13 over a suitable length of the latter so as to allow the base skin 13 to be folded over itself. Thus, the cores 11 may be placed over a distance less than half of the length of said skin 13 so that it is possible to have an upper surface 3 with a length substantially equal to that of the lower surface 5.

In the second embodiment of the panel, the first 11 and second 12 cores are the ones which are placed on the base skin 13 over a suitable length of the latter so that the base skin 13 may be folded over itself. Thus, the first 11 and second 12 cores may be placed over a distance less than half the length of said skin 13 so that it is possible to have an upper surface 3 with a length substantially equal to that of the lower surface 5.

Draping is typically carried out before laying the cores 11 on the base skin 13 or the first 11 and second 12 cores on the base skin 13. Draping is then achieved with a draping skin of the monolithic type 15 having a plurality of folds, for example two or three folds in order to obtain optimum draping. Typically, the draping skin 15 includes a number of folds less than that of the base skin 13.

The base skin 13 may comprise a number of folds greater than 2, equal to 3, to 5 or more.

The draping skin 15 may comprise a number of folds greater than 2, equal to 3, to 5 or more.

The folds of the base skin 13 and of the draping skin 15 are impregnated with polymerizable resin such as epoxy resin.

In step B, the base skin 13 is folded over itself by any means known to one skilled in the art so as to form an edge 7, an upper surface 3 and a lower surface 5.

Typically, the polymerization of step C is achieved by heating to a baking temperature. The baking temperature depends on the type of resin used for making the one-piece panel 1 of the invention. As an example, if the base 13 and/or draping 15 skin is/are made with epoxy resin, the baking temperature is comprised between 60° C. and 200° C.

This step is typically carried out in an autoclave or any heating means.

Typically, the base skin 13 and the draping skin 15 comprise folds based on fibers such as glass fibers, carbon fibers and Kevlar fibers, such fibers being impregnated with polymerizable resin during the baking of the material.

In step D, according to the embodiment of the panel, the thereby formed cores 11 or first cores 11 and second core(s) 12 of the panel are removed by any means known to one skilled in the art, notably by extractors handled manually or automatically. Removal of the cores is typically achieved along a direction substantially colinear to the direction assumed by the transversal stiffeners 9 or the spar(s) 10, if necessary.

The panel 1 of the invention may advantageously be used in an element of an aircraft such as an airplane control surface.

The invention claimed is:

1. A composite structuring panel of a trailing edge for an element of an aircraft having:
    an upper surface;
    a lower surface;
    a trailing edge connecting said upper and lower surfaces, wherein the upper surface and the lower surface are connected through transverse stiffeners and the structuring panel comprises a one-piece part forming the upper surface the lower surface, the trailing edge as well as the transverse stiffeners;
    wherein skin forming said panel includes a plurality of folds, one or more interior folds of which form the transverse stiffeners;
    wherein the totality or part of the plurality of folds are sewn together.

2. The panel according claim 1, wherein at least one longitudinal spar is positioned so that a guiding axis of each longitudinal spar and a guiding axis of the transverse stiffeners are not colinear and the structuring panel comprises a one-piece part forming the upper surface, the lower surface, the trailing edge, the transverse stiffeners and the longitudinal spar(s).

3. The panel according to claim 2, wherein the guiding axis of each longitudinal spar and the guiding axis of the transverse stiffeners are substantially perpendicular.

4. The panel according claim 2, wherein at least one longitudinal spar is positioned between two transverse stiffeners.

5. The panel according to claim 2, wherein skin forming said panel includes a plurality of folds, one or more interior folds of which form the longitudinal spar(s).

6. The panel according to claim 1, further comprising reinforcement folds between the interior folds.

7. A method for manufacturing a panel according to claim 1, comprising:
    a first step in which cores are deposited, each surrounded at least partially by a draping skin, on a base skin over a suitable length of the latter so as to allow the base skin to be folded over itself;
    a second step wherein the base skin is folded over the draped cores;
    a third step wherein the thereby obtained panel is polymerized so as to integrate the folds of the draping into the base skin for forming the transverse stiffeners; and
    a fourth step wherein the cores are removed in order to obtain the structuring panel.

8. The method according to claim 7, wherein the cores have a decreasing height along a length of said cores.

9. The method according to claim 7 wherein each core is draped by a draping skin of the monolithic type having a plurality of folds.

10. The method according to claim 7, further comprising:
    a first step wherein the first cores and at least one second core are deposited, each surrounded at least partly by a draping skin on a base skin along two non-collinear directions so that said base skin may be folded on itself;
    a second step wherein the base skin is folded on the first and second draped cores;
    a third step wherein the thereby obtained panel is polymerized so as to integrate the folds of the draping into the base skin in order to form the transverse stiffeners and the longitudinal spar(s); and
    a fourth step wherein the first cores and the second core(s) are removed in order to obtain the structuring panel.

11. The method according to claim 10, wherein the second core(s) have a decreasing height following a cross-section of said cores.

12. The method according to claim 10, wherein each first and second cores are draped by a draping skin of the monolithic type having a plurality of folds.

13. The method according to claim 7, wherein in step A, the first cores are positioned before the trailing edge so as to form a space between the trailing edge and the first cores, a space in which one or several second cores substantially parallel to the trailing edge are installed.

14. An element of an aircraft including at least one structuring panel obtained according to claim 7.

15. The element according to claim 14 being an airplane control surface.

16. An element of an aircraft including at least one structuring panel according to claim 1.

17. The element according to claim 16 being an airplane control surface.

* * * * *